United States Patent
Koppal et al.

(10) Patent No.: US 10,247,970 B2
(45) Date of Patent: Apr. 2, 2019

(54) MEASURING STRAIN ON DISPLAY DEVICE

(71) Applicant: Microsoft Technology Licensing, LLC, Redmond, WA (US)

(72) Inventors: Rohit Krishna Koppal, Redmond, WA (US); Chandrashekar Gernipalli Subba, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 45 days.

(21) Appl. No.: 15/385,855

(22) Filed: Dec. 20, 2016

(65) Prior Publication Data

US 2018/0173028 A1 Jun. 21, 2018

(51) Int. Cl.
*G02F 1/00* (2006.01)
*G02F 1/13* (2006.01)
*G09G 3/00* (2006.01)
*G02F 1/1333* (2006.01)

(52) U.S. Cl.
CPC .......... *G02F 1/1309* (2013.01); *G02F 1/1333* (2013.01); *G09G 3/006* (2013.01); *G02F 2201/503* (2013.01)

(58) Field of Classification Search
CPC ............................. G02F 1/1309; G09G 3/006
USPC ................................. 703/1, 4, 7, 13, 20–22
See application file for complete search history.

(56) References Cited

U.S. PATENT DOCUMENTS

| | | | |
|---|---|---|---|
| 5,837,619 A | 11/1998 | Adachi et al. | |
| 7,460,216 B2 | 12/2008 | Lecomte et al. | |
| 7,465,678 B2 | 12/2008 | Bhattacharya et al. | |
| 7,726,199 B2 | 6/2010 | Shkel et al. | |
| 8,272,273 B2 | 9/2012 | Chen et al. | |
| 8,650,966 B2 | 2/2014 | McMillan | |

(Continued)

FOREIGN PATENT DOCUMENTS

| | | |
|---|---|---|
| CN | 204833206 U | 12/2015 |
| KR | 20140022180 A | 2/2014 |
| WO | 2015099001 A1 | 7/2015 |

OTHER PUBLICATIONS

"TDM Technology", http://www.insidix.com/INSIDIX-Technologies.6.0.html, Retrieved on: Sep. 30, 2016, 1 pages.

(Continued)

*Primary Examiner* — Jonathan Dunlap
(74) *Attorney, Agent, or Firm* — Holzer Patel Drennan

(57) ABSTRACT

A display includes an integrated strain-gauge layer in or on the display for measuring the strain at a plurality of locations on the display. The display is deformable and secured to a display device by a first chassis. A method includes measuring, over a period of time, strain of the display of a first device at the plurality of locations and recording the strain measurements in a memory of the display device. Strain measurements associated with a failure of the display may be identified. The method may include simulating a dynamic system including a model of a second device. The model of the second device includes a model of a second chassis different than the first chassis and a model of the display associated with the failure. Simulating the dynamic system may include simulating deformation of the model of the display based on the identified strain measurements.

20 Claims, 12 Drawing Sheets

(56) References Cited

U.S. PATENT DOCUMENTS

| | | | |
|---|---|---|---|
| 8,655,635 B2* | 2/2014 | Noonan | G06F 17/5036 703/14 |
| 8,922,523 B2 | 12/2014 | Lynch et al. | |
| 2006/0030062 A1 | 2/2006 | He et al. | |
| 2007/0239409 A1* | 10/2007 | Alan | G06F 17/5009 703/2 |
| 2009/0216509 A1* | 8/2009 | Baker | G06F 17/5009 703/11 |
| 2010/0123686 A1 | 5/2010 | Klinghult et al. | |
| 2013/0066619 A1* | 3/2013 | Noonan | G06F 17/5036 703/14 |
| 2013/0082973 A1 | 4/2013 | Wurzel et al. | |
| 2013/0127606 A1 | 5/2013 | Chang | |
| 2013/0136874 A1 | 5/2013 | Xia et al. | |
| 2013/0340533 A1 | 12/2013 | Hofmann et al. | |
| 2014/0331781 A1 | 11/2014 | Lee et al. | |
| 2015/0050916 A1 | 2/2015 | Bandyopadhyay et al. | |
| 2015/0296622 A1 | 10/2015 | Jiang et al. | |
| 2016/0169664 A1 | 6/2016 | Hayashi et al. | |
| 2016/0293884 A1 | 10/2016 | Zhang et al. | |
| 2016/0313234 A1 | 10/2016 | Sudo et al. | |
| 2016/0338188 A1 | 11/2016 | Dighde et al. | |

OTHER PUBLICATIONS

Singh, et al., "Deformation of Display for Handheld Devices During Drop Impact", In Proceedings of IEEE 66th Electronic Components and Technology Conference, May 31, 2016, 2 pages.

Wang, et al., "Deformation capture and modeling of soft objects", In Journal of ACM Transactions on Graphics, vol. 34, No. 4, Aug. 9, 2015, 12 pages.

"Non-Provisional Application as Filed in U.S. Appl. No. 15/385,855", dated Dec. 20, 2016, 32 Pages.

"Drop simulation/experimental verification and shock resistance improvement of TFT-LCD monitors", dated Feb. 12, 2007, 12 Pages.

* cited by examiner

MEASURING STRAIN ON DISPLAY DEVICE

Consumers often prefer that mobile devices, such as tablet computers, mobile telephones, and laptops, are thin and light. To achieve thin and light devices, manufacturers may choose to reduce the weight and thickness of the housing and chassis that hold and protect the components within the devices. Lighter and thinner housings and chassis, however, may make the components of the mobile device more prone to failure. For example, dropping the device may break the display of the device.

DESCRIPTION

The following detailed description refers to the accompanying drawings. The same reference numbers in different drawings may identify the same or similar elements. Also, the following detailed description is exemplary and explanatory only and is not restrictive of the invention, as claimed.

A display device, such as a tablet computer, has a housing and/or a chassis to hold and protect the components of the device. For example, the chassis may protect the display of the device. All too often, users drop their devices and break the display. As manufactures design lighter and thinner chassis to improve user experience, chassis lose stiffness and displays become even more prone to breaking when dropped. Although users may be happy with a lighter and thinner device, users are generally not happy when the chassis of their device does not provide adequate protection.

Manufacturers may design and test devices in an iterative process: a device designed, made, tested, and designed again based on the test results. The process repeats itself. For example, a manufacturer may design and make a test device with a test chassis. To test the device, the manufacturer drops the device to see whether the display breaks (e.g., cracks). If the display breaks, the manufacturer may redesign the device with a redesigned (hopefully improved) chassis, and make the device again but with the improved chassis. After another drop test, the manufacturer determines whether the device meets its drop-test requirements.

The design/build/test process described above, however, can be very time consuming and expensive. Embodiments described below may enable a more rapid prototyping and testing of devices. As a result, these embodiments may enable lighter and less expensive display devices, while still providing the desired structural support and protection. As an additional result, these embodiments may enable manufactured devices to be more reliable when used by consumers in the field. Because the device itself may be lighter, some embodiments enable a more rapid assembly or disassembly of devices with lighter and faster assembly equipment.

Figure 1:
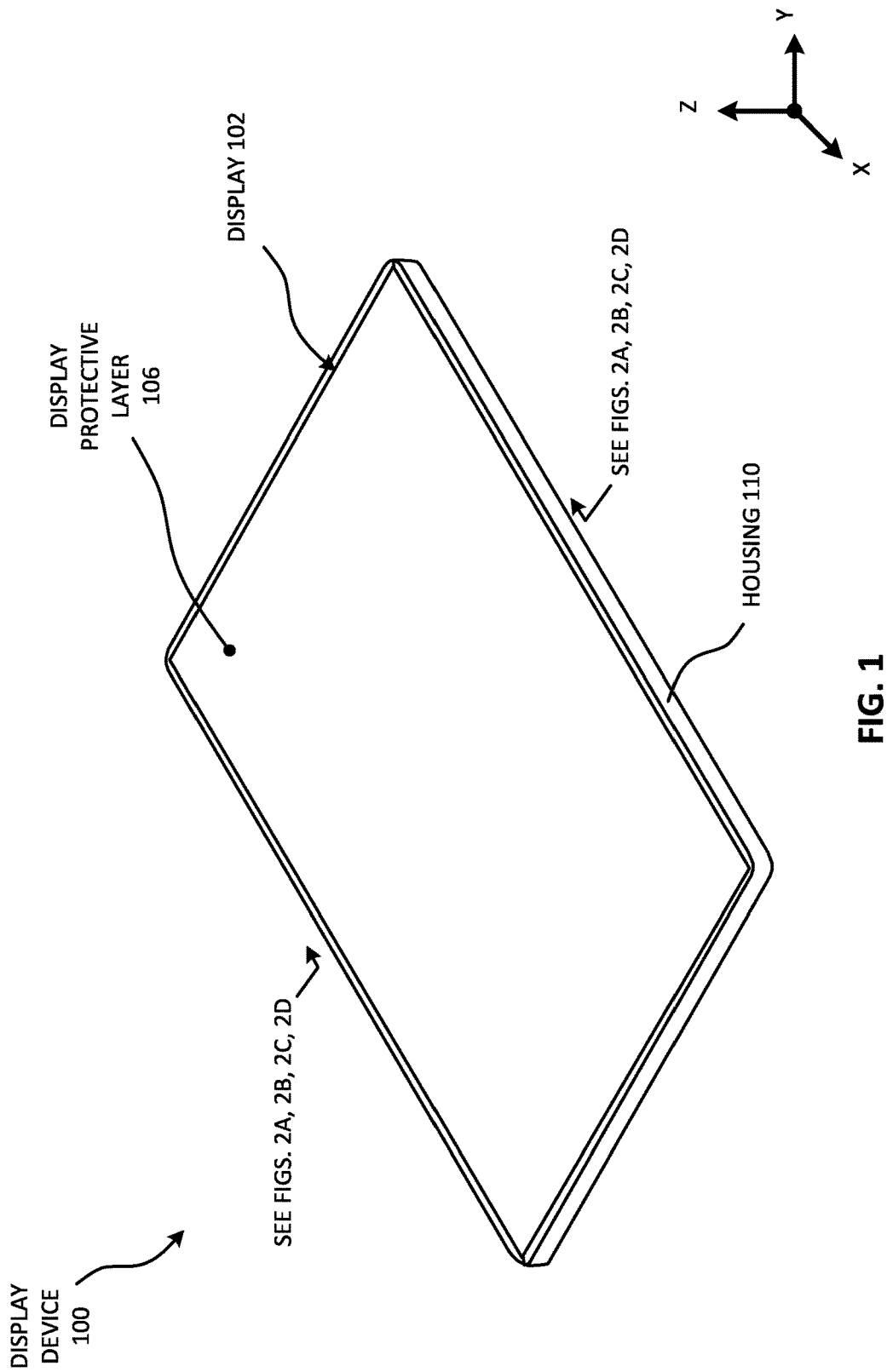
FIG. 1 illustrates an exemplary display device in one embodiment.

FIG. 1 is a perspective view of an exemplary display device 100, in one embodiment, manifest as a tablet computer. Although display device 100 is shown as a tablet computer in FIG. 1, display device 100 may be a mobile phone, a laptop, or any other device with a display for viewing. Display device 100 includes a display 102 surrounded by a housing 110 to encompass and protect the components of display device 100, including display 102. The top-most (e.g. exposed) layer of display 102 may include a protective layer 106. FIG. 1 also defines an x-axis, y-axis, and z-axis such that the exposed layer of display 102 is the "top most" layer and the "bottom" of display device 100 is not visible in FIG. 1. Housing 110 may also be referred to as a "chassis" and it provides the frame to which components of display device 100 are attached.

Even though housing 110 protects display 102, if housing 110 experiences sufficient forces, display 102 may deform and fail. For example, if display device 100 falls and lands on the floor, glass within display 102 could crack. A failure may also include display 102 showing incorrect colors to the user. For example, a location on display 102 may incorrectly appear as white on a black background instead of red, blue and/or green on a black background. Both of these failures may result from strain (e.g., a force) deforming or warping a component of display 102, as discussed in more detail below with respect to FIGS. 2A through 2D.

FIGS. 2A through 2D illustrate exemplary cross-sectional views of display devices in different embodiments, such as display device 100 shown in FIG. 1. For clarity, only a portion of the sectional view is shown in FIGS. 2A through 2D.

Figure 2A:
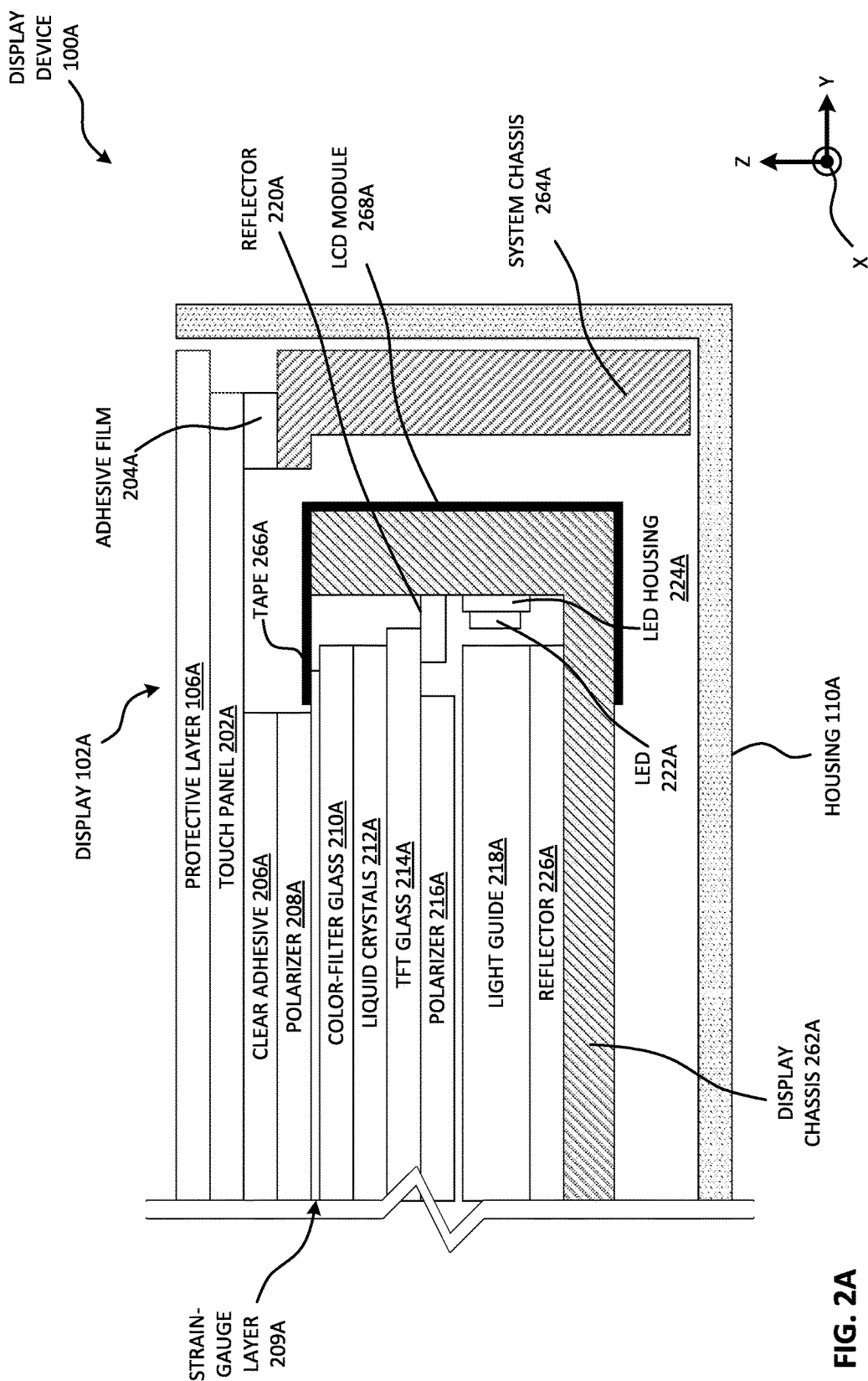
FIGS. 2A, 2B, 2C, and 2D illustrate exemplary cross-sectional views of display devices, such as the display device shown in FIG. 1.

FIG. 2A shows a cross-sectional view of a display device 100A in one embodiment. Display device 100A includes a housing 110A, a display chassis 262A, and a system chassis 264A. In display device 100A, the following components are positioned within display chassis 262A: a strain-gauge layer 209A, a color-filter glass 210A, liquid crystals 212A, a thin-film transistor (TFT) glass 214A, a polarizer 216A, a light guide 218A, a reflector 220A, a light-emitting diode (LED) 222A, an LED housing 224A, and a reflector 226A.

Display 102A operates as follows. LED 222A generates light that travels through light guide 218A as aided by reflector 226A and/or reflector 220A. Light from light guide 218A passes through polarizer 216A and emerges into TFT glass 214A with a single polarization. TFT glass 214A controls liquid crystals 212A such that some of the light may change polarization as the light passes through liquid crystals 212A to color-filter glass 210A. The light emerging from color-filter glass 210A may be of a particular color (e.g., red, green, blue) and passes through strain-gauge layer 209A, which is optically clear. Depending on the polarization of the light (as controlled by TFT glass 214A and liquid crystals 212A), the colored light may or may not pass through polarizer 208A. Colored light that does pass through polarizer 208A then passes through clear adhesive 206A, touch panel 202A, and protective layer 106A to the user's eyes. The user may interact with display device 100A by touching touch panel 202A, for example.

Assembly of display device 100A may involve the cumulative stacking of the following components in display chassis 262A: reflector 226A, light guide 218A, polarizer 216A, TFT glass 214A, liquid crystals 212A, and color-filter glass 210A. In this embodiment, strain-gauge layer 209A may be integrally formed on the surface of color-filter glass 210A. These components may be stacked into display chassis 262A or may be stacked first and placed into display chassis 262A. In one embodiment, tape 266A may hold the components relative to display chassis 262A to form an LCD module 268A. System chassis 264A helps secure LCD module 268A to the remaining components of display device 100A.

Tape 266A may impart mechanical stress forces on the LCD module 268A, which can induce physical deformation of LCD module 268A (e.g., including color-filter glass 210A and/or liquid crystals 212A). In other words, the stress forces can cause LCD module 268A to deform (e.g., be non-planar or warped), which may pose difficulty in subsequent construction steps. The stress may also cause the display device 100A to be more prone to failure, such as breakage or display artifacts (e.g., incorrect color rendering) after assembly.

If display chassis 262A is formed of metal, chassis 262A may be heavy and/or thick, but the added weight and/or strength may reduce the likelihood of display 102A failing during assembly, use, or disassembly. Although a thicker and heavier chassis 262A (e.g., a stiffer chassis 262A) may reduce the likelihood of display 102A failing, a thicker and heavier chassis 262A may increase the cost and diminish the user experience. The same tradeoffs may apply to system chassis 264A and/or housing 110A. In some instances, it may be desirable to minimize the cost, weight, and thickness of display chassis 262A, housing 110A, and/or system chassis 264A (e.g., reduce stiffness of system chassis 264A) while providing sufficient weight and thickness to protect display 102A from failure at reasonable cost. Methods and systems described herein may aid the designer of display device 100A to achieve this balance between weight, thickness, probability of failure, and cost.

Strain-gauge layer 209A (generally "strain-gauge layer 209") measures the deformation and/or forces imparted on color-filter glass 210A. Strain-gauge layer 209A may measure the strain and/or deformation in numerous places on the surface of color-filter glass 210A. These measurements may be indicative of not only the deformation of (and forces on) color-filter glass 210A, but also the other layers of display 102A, such as liquid crystals 212A, TFT glass 214A, polarizer 208A, touch panel 202A, and/or protective layer 106A. In one embodiment, strain-gauge layer 209A is formed on the surface of color-filter glass 210A.

Figure 2B:
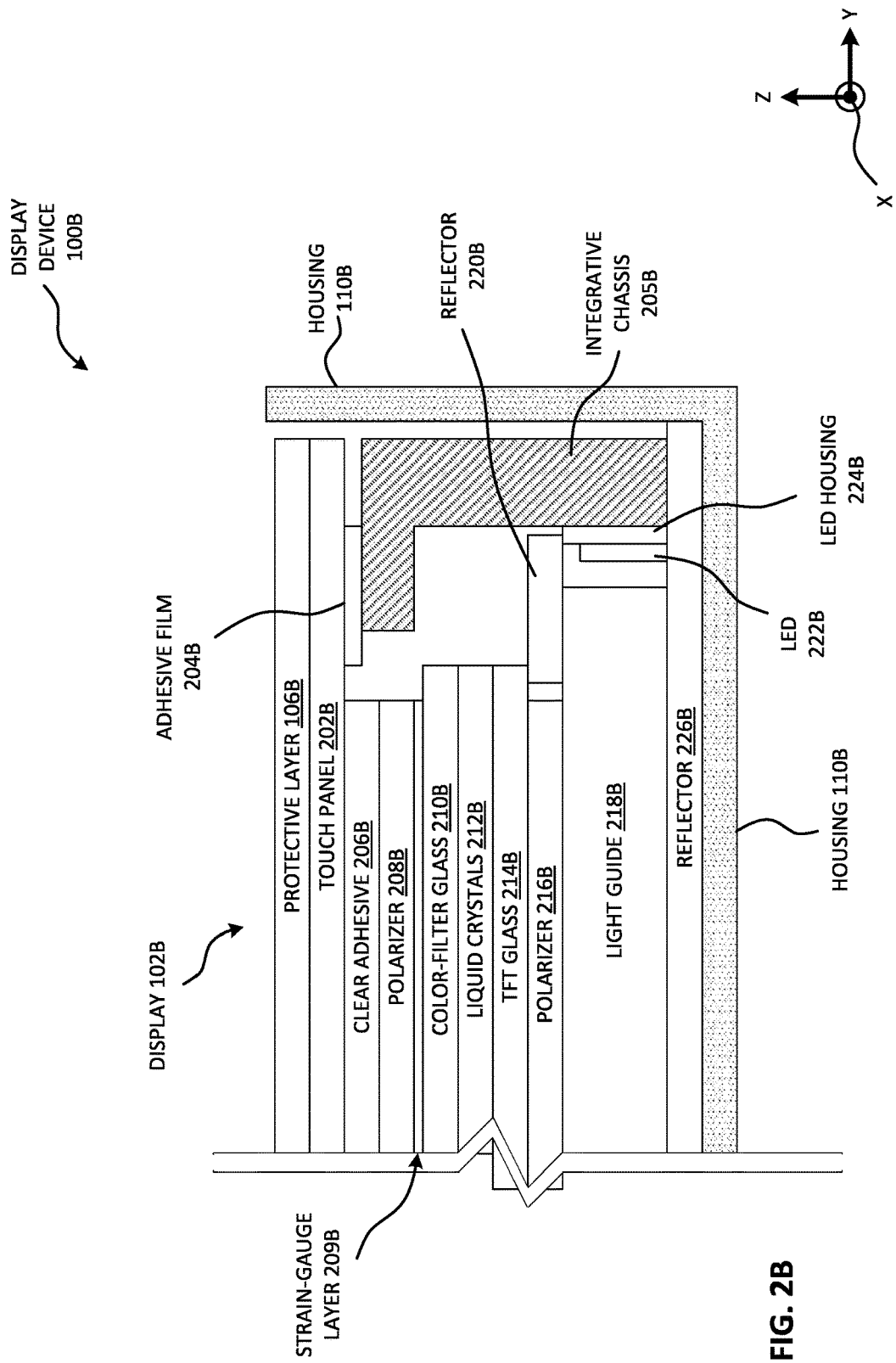

FIG. 2B shows a cross-sectional view of a display device 100B in another embodiment. As shown, display device 100B may include housing 110B and an integrative chassis 205B. An integrative chassis 205B may replace and perform the functions of display chassis 262A and system chassis 264A of display device 100A. Display device 100B may also include protective layer 106B, touch panel 202B, adhesive film 204B, optically-clear adhesive 206B, polarizer 208B, strain-gauge layer 209B, color-filter glass 210B, liquid crystals 212B, TFT glass 214B, polarizer 216B, light guide 218B, reflector 220B, LED 222B, LED housing 224B, and reflector 226B. The components of display device 100B of FIG. 2B operate similarly to the components described above for display device 100A of FIG. 2A.

In one embodiment, the following components may be positioned within and/or supported by integrative chassis 205B: strain-gauge layer 209B, color-filter glass 210B, liquid crystals 212B, TFT glass 214B, polarizer 216B, light guide 218B, reflector 220B, LED 222B, LED housing 224B, and reflector 226B. In addition to providing structural support to these components, integrative chassis 205B can provide structural support for touch panel 202B, clear adhesive 206B, polarizer 208B, and/or protective layer 106B.

In one embodiment, the integrative chassis 205B may facilitate assembly of the display device 100B. Further, integrative chassis 205B may facilitate disassembly, reworking, and/or removal of display 102B from the display device 100B. In other words, protective layer 106B, touch panel 202B, adhesive film 204B, optically-clear adhesive 206B, and/or polarizer 208B can be removed from display device 100B, followed by integrative chassis 205B (with components 209B through 226B being removed). Components can be repaired or a new integrative chassis 205B (with associated components 209B through 226B) can be installed.

Integrative chassis 205B may be formed of any material that can provide structural support to the display components and/or allow features to be formed therein. Example materials can include various plastics, polymers, and/or composites, among others. If integrative chassis 205B is formed of metal, for example, chassis 205B may be heavy and/or thick, but the added weight and/or strength may reduce the likelihood of display 102B failing during assembly, use, or disassembly. Although a thicker and heavier chassis 205B may reduce the likelihood of display 102B failing, a thicker and heavier chassis 205A may increase the cost and diminish the user experience. The same tradeoffs may apply to housing 110B. In some instances, it may be desirable to minimize the cost, weight, and thickness of chassis 205B, and/or housing 110B while providing sufficient weight and thickness to protect display 102B from failure at reasonable cost. Methods and systems described herein may aid the designer of display device 100B to achieve this balance between weight, thickness, probability of failure, and cost.

Figure 2C:
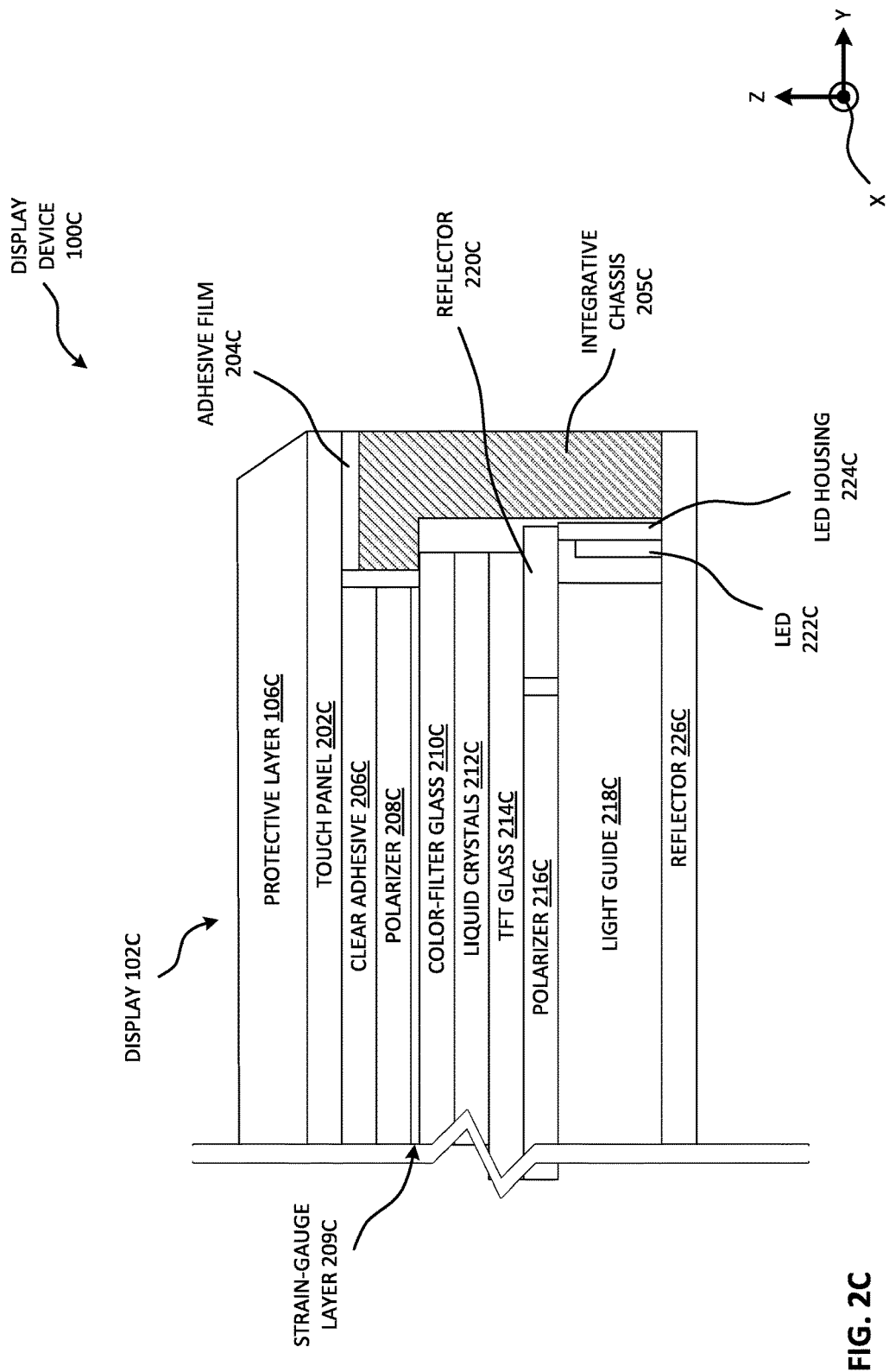

FIG. 2C shows a cross-sectional view of a display device 100C in another embodiment. The components of display device 100C of FIG. 2C operate similarly as the components described for display device 100A of FIG. 2A. In this embodiment, however, integrative chassis 205C performs the function of housing 110B and integrative chassis 205B of display device 100B as shown in FIG. 2B. Components can be assembled from the bottom up (e.g., inserted from the bottom and layered sequentially top to bottom) starting with the color-filter glass 210C (integrated with strain-gauge layer 209C), liquid crystals 212C, TFT glass 214C, polarizer 216C, light guide 218C, and reflector 226C.

Figure 2D:
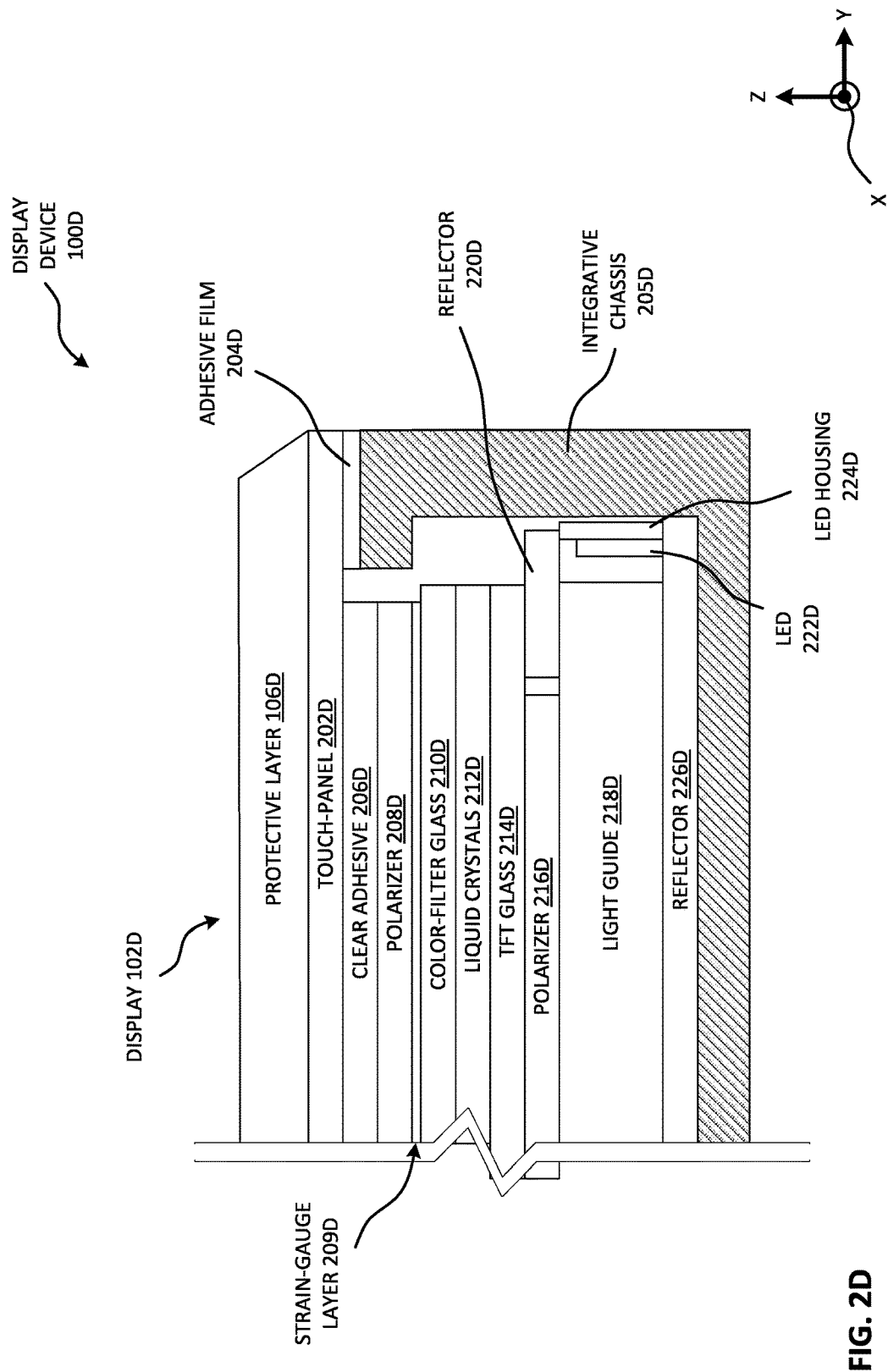

FIG. 2D shows a cross-sectional view of a display device 100D in another embodiment. The components of display device 100D of FIG. 2D operate similarly as the components described above for display device 100A of FIG. 2A. In this embodiment, integrative chassis 205D may perform the functions of integrative chassis 205B and housing 110B of display device 100B. Integrative chassis 205D of FIG. 2D extends vertically as well as horizontally. Thus, integrative chassis 205D supports the reflector 226D across the entire width of reflector 226D.

Although a thicker and heavier chassis 205C and/or 205D may reduce the likelihood of display 102B failing, a thicker and heavier chassis 205C and/or 205D may increase the cost and diminish the user experience. In some instances, it may be desirable to minimize the cost, weight, and thickness of chassis 205C and/or 205D while providing sufficient weight and thickness to protect display 102C and/or 102D from failure at reasonable cost. Methods and systems described herein may aid the designer of display device 100C and/or device 100D to achieve this balance between weight, thickness, probability of failure, and cost.

Display device 100 (e.g., device 100A, 100B, 100C, and/or 100D) may include different, fewer, or more components than shown in FIGS. 2A through 2D. For example, in other embodiments, components of display 102 may snap-fit into display device 100 without the use of adhesives. Further, display device 100 may include components, such as a processor, that are discussed with respect to FIG. 5. Strain-gauge layer 209 is shown in FIGS. 2A through 2D as attached to the top side of color-filter glass 210. In addition, strain-gauge layer 209 may be in locations other than (or in addition to) those shown in FIGS. 2A through 2D. For example, strain-gauge layer 209 may be attached to either side (e.g., top or bottom) of protective layer 106, touch panel 202, clear adhesive 206, polarizer 208, color-filter glass 210, liquid crystals 212, TFT glass 214, polarizer 216, light guide 218, and/or reflector 226. In one embodiment, strain-gauge layer 209 may be placed on or between other components. For example, strain-gauge layer 209 may be placed between reflector 226 and integrative chassis 205. Multiple strain-gauge layers 209 may also be placed in multiple locations listed above. In these locations, strain can be measured and is indicative of strain on other components of display device 100.

Figure 3A:
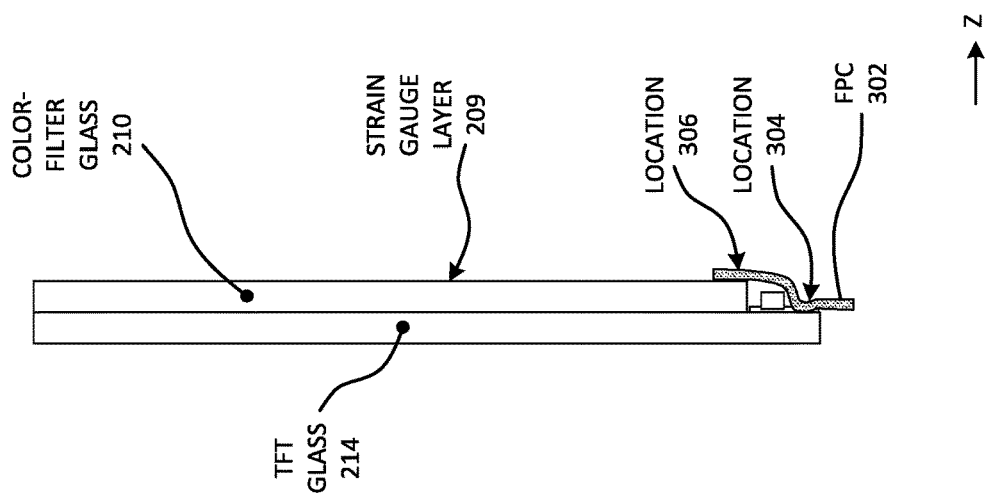
FIGS. 3A and 3B illustrate a strain-gauge layer and strain-gauge controller relative to a color-glass filter and a thin-film-transistor layer in one embodiment of a display device.
Figure 3B:
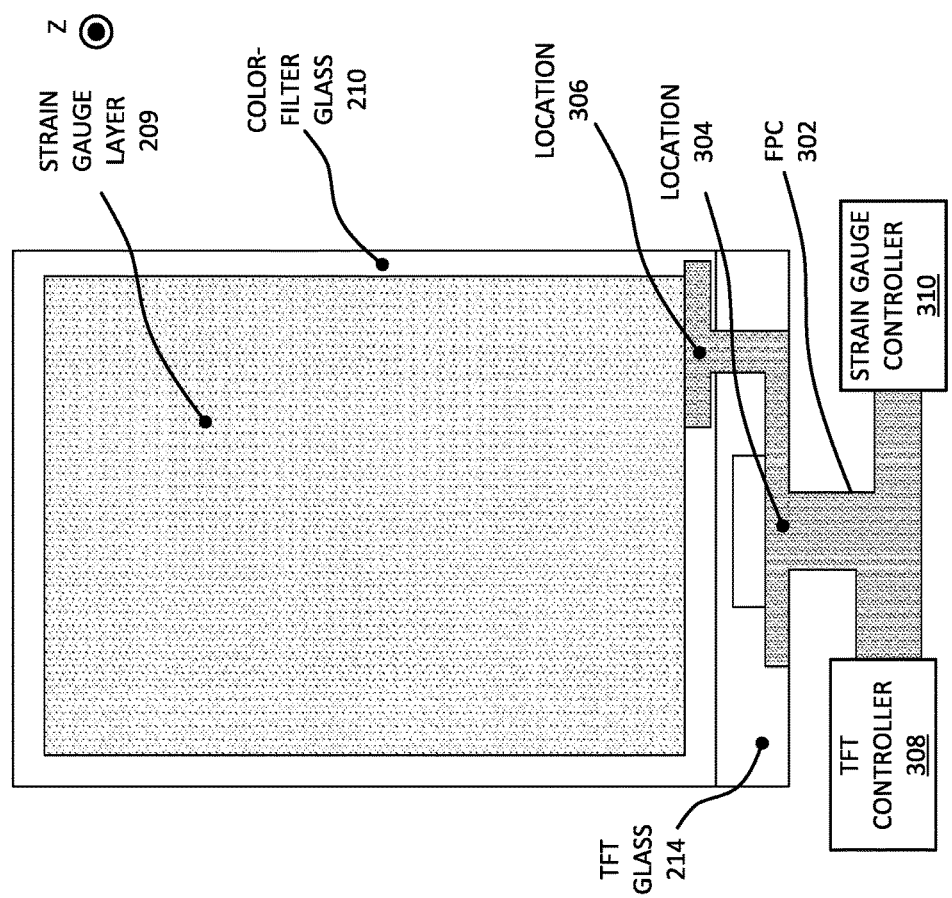

FIGS. 3A and 3B illustrate strain-gauge layer 209 and a strain-gauge controller 310, in one embodiment, relative to color-filter glass 210 and TFT glass 214. In particular, FIG. 3A illustrates a side view of color-filter glass 210 stacked against TFT glass 214 in display 102. FIG. 3B shows a frontal view of strain-gauge layer 209 on top of color-filter glass 210. A flexible printed circuit (FPC) 302 may be bonded (e.g., using anisotropic conductive film (ACF) bonding) to TFT glass 214 at location 304. FPC 302 carries the electrical signals from TFT controller 308 to the transistors (e.g., in TFT glass 214) to control the liquid crystals 212 for controlling the polarization of light passing through TFT glass 214 to color-filter glass 210.

In one embodiment, FPC 302 may also carry electrical signals to and/or from strain-gauge layer 209 and strain-gauge controller 310. In this embodiment, FPC 302 splits and is also bonded (e.g., ACF bonded) to color-filter glass 210 (and/or the strain-gauge layer 209 on the surface of color-filter glass 210) at location 306. When color-filter glass 210 becomes deformed, then signals indicative of the deformation and/or strain may be transmitted from strain-gauge layer 209 to strain-gauge controller 310 in display device 100.

Figure 3C:
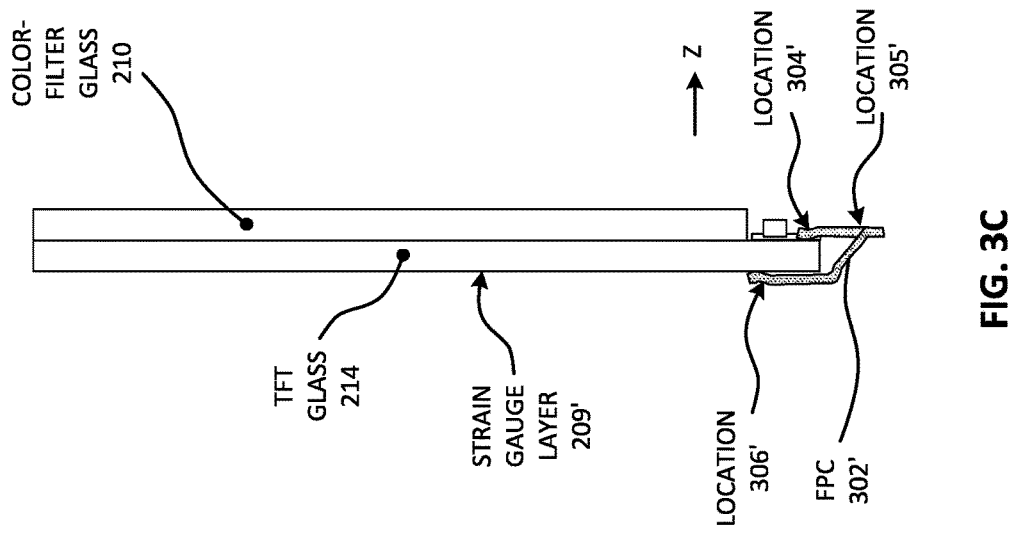
FIGS. 3C and 3D illustrate a strain-gauge layer and strain-gauge controller relative to a color-glass filter and a thin-film-transistor layer in another embodiment of a display device.
Figure 3D:
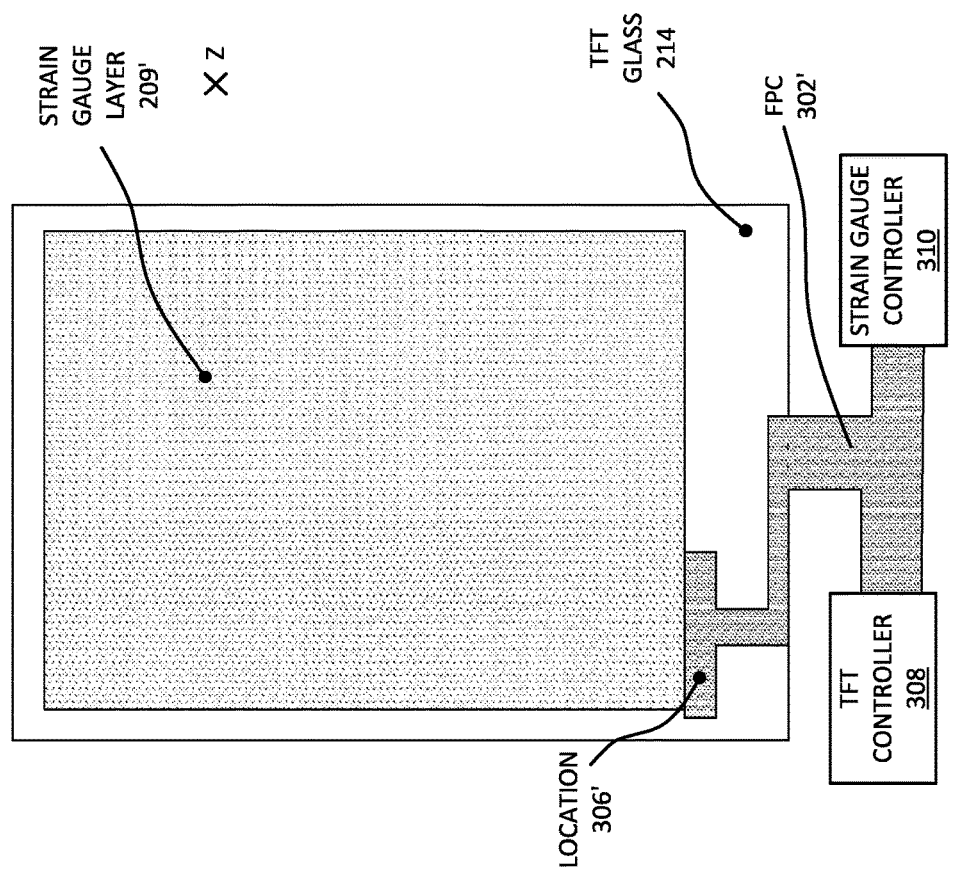

FIGS. 3C and 3D illustrate strain-gauge layer 209' and strain-gauge controller 310, in another embodiment, relative to color-filter glass 210 and TFT glass 214. In contrast to FIGS. 3A and 3B, FIGS. 3C and 3D show a view of strain-gauge layer 209' on bottom of TFT glass 214 (e.g., rather than on the top of color-filter glass 310). A FPC 302' may be bonded (e.g., using ACF bonding) to the top of TFT glass 214 at location 304' (e.g., a similar location as with FIGS. 3A and 3B). FPC 302' carries the electrical signals from TFT controller 308 to the transistors (e.g., in/on TFT glass 214) to control the liquid crystals 212 for controlling the polarization of light passing through TFT glass 214 to color-filter glass 210.

In one embodiment, FPC 302' may also carry electrical signals to and/or from strain-gauge layer 209' and strain-gauge controller 310. In this embodiment, FPC 302' splits at location 305' (shown in FIG. 3C) and is also bonded (e.g., ACF bonded) to TFT glass 214 (and/or strain-gauge layer 209' on the bottom surface of TFT glass 214) at location 306'. When TFT glass 214 becomes deformed, signals indicative of the deformation and/or strain may be transmitted from strain-gauge layer 209' to strain-gauge controller 310 in display device 100. The bonding of FPC 302' to TFT glass 214 at location 304' is visible in FIG. 3C, but not visible in FIG. 3D because of the perspective in FIG. 3D from the bottom-side of TFT glass 214.

In yet another embodiment, strain-gauge layer 209 and TFT glass 214 have completely separate FPCs connecting each to their strain-gauge controller 310 and TFT controller 308, respectively.

As discussed, display device 100 may include strain-gauge layer 209. As display 102 (e.g., color-filter glass 210 and/or TFT glass 214) deforms (e.g., warps), a force may be exerted on strain-gauge layer 209 and characteristics (e.g., resistance and/or reactance) of components in strain-gauge layer 209 may change. For example, the resistance of a resistor, the capacitance of a capacitor, and/or the inductance or an inductor in strain-gauge layer 209 may change. Strain-gauge controller 310 may detect or measure the change in characteristics of components in strain-gauge layer 209 and determine the magnitude of strain applied to color-filter glass 210 or degree of deformation of color-filter glass 210.

Strain-gauge layer 209 may include any material that has characteristics that can be measured that change in response to force on or deformation of one or more components of display 102, such as color-filter glass 210, TFT glass 214, etc. In one embodiment, strain-gauge layer 209 may include one or more thin films spaced at a distance that vary in capacitance when force is applied to one of the films (e.g., by the deformation of color-filter glass 210, TFT glass 214, etc.). In another embodiment, strain-gauge layer 209 may include one or more components that vary in resistance when force is applied to the components (e.g., by the deformation of color-filter glass 210, TFT glass 214, etc.). Other embodiments of strain-gauge layer 209 may include piezoelectric material and/or optical materials that have characteristics that change when force is applied to the materials (e.g., by deformation of color-filter glass 210, TFT glass 214, etc.).

Although strain-gauge layer 209 is shown in FIGS. 2A though 2D, 3A, and 3B as coupled directly to one side of color-filter glass 210, strain-gauge layer 209 may be directly coupled to other layers and/or sides of layers in display 102. For example, strain-gauge layer 209 may be directly coupled to either side (e.g., top or bottom) of: TFT glass 214, polarizer 215, light guide 218, reflector 226, protective layer 106, touch panel 202, clear adhesive 206, and/or polarizer 208. In addition, more than one strain-gauge layer 209 may be employed in display device 100 (e.g., two, three, four, five, six, seven, eight, nine or more layers).

As noted above, strain-gauge layer 209 may be attached to any surface of any of the components of display device 100. Since the components of display device 100 are tightly assembled, the strain measurements of one component are also indicative of the force on or the deformation of other components of display device 100. For example, strain measured on the top of color-filter glass 210 may be indicative of strain on protective layer 106, touch panel 202, polarizer 208, liquid crystals 212, TFT glass 214, polarizer 216, light guide 218, and/or reflector 226. Likewise, the strain measured on the bottom of TFT glass 214 may be indicative of strain on protective layer 106, touch panel 202, polarizer 208, liquid crystals 212, color-filter glass 210, polarizer 216, light guide 218, and/or reflector 226.

Further, although TFT LCDs are shown in FIGS. 2A through 2D and FIG. 3, strain-gauge layer 209 may be incorporated into any type of display, such as an organic light-emitting diode display (OLED) surface-conduction electron-emitter display (SED), field-emission display (FED), cathode ray tube display (CRD), light-emitting diode display (LED), electroluminescent display (ELD), electronic paper or e-ink display, a high-performance addressing LCD display, a quantum dot display, and/or an interferometric modular display. In fact, the methods and systems described herein may apply to detecting failures (e.g., due to strain) on devices other than devices that have displays.

Figure 4:
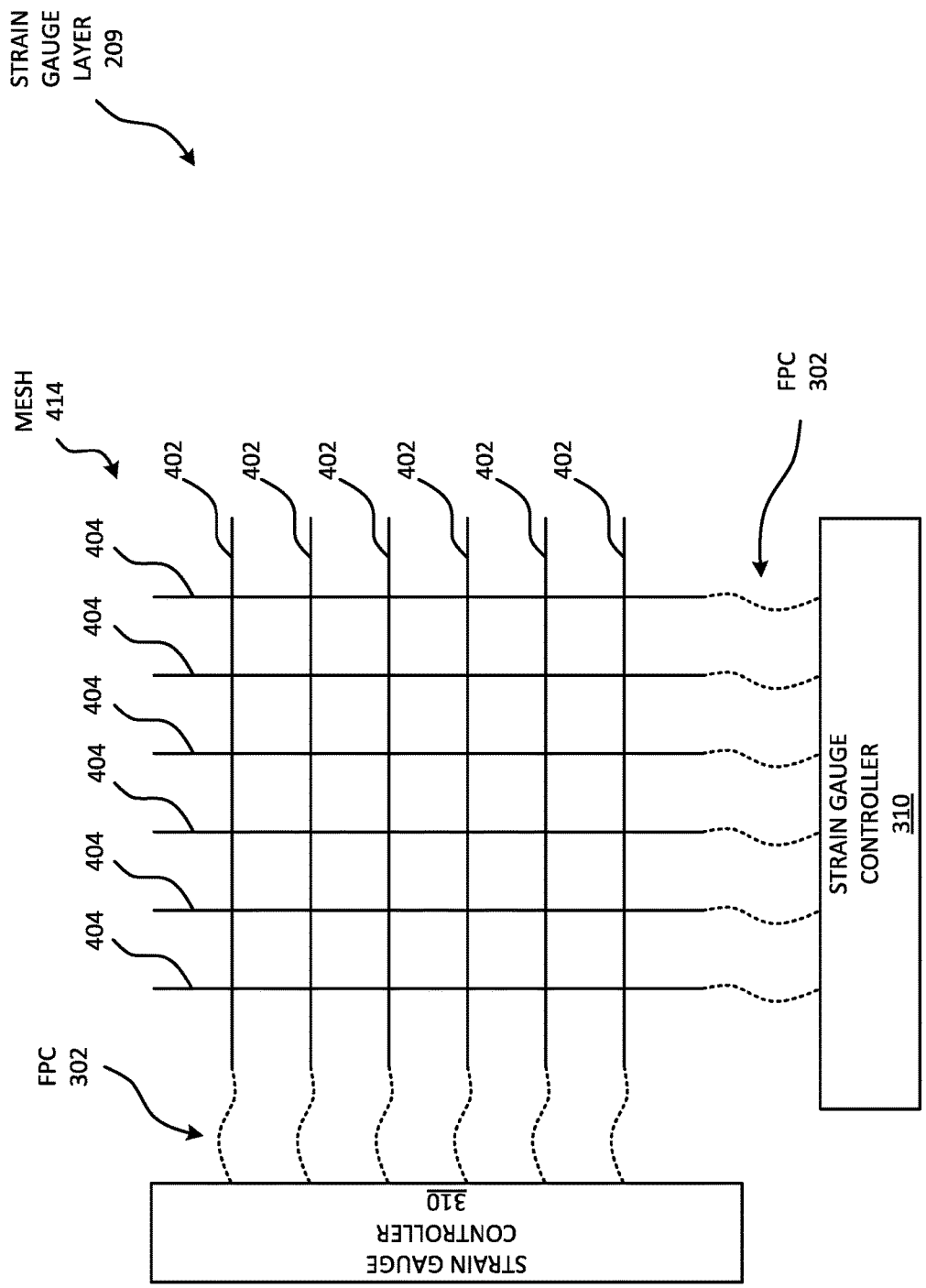
FIG. 4 illustrates an exemplary strain-gauge layer in one embodiment.

FIG. 4 illustrates an exemplary strain-gauge layer 209 in one embodiment. Strain-gauge layer 209 may be disposed within or overlaid on color-filter glass 210, as shown in FIGS. 3A and 3B. Strain-gauge layer 209 may include rows of conductors 402 and columns of conductors 404 that overlap in separate planes, for example, forming a mesh 414. In the embodiment of FIG. 4, conductors 402, 404 are connected to strain-gauge controller 310 to measure the electrical characteristics of mesh 414.

In one embodiment, the conductors 402, 404 may include Indium Tin Oxide (ITO). In other embodiments, conductors 402, 404 may include gold, copper, silver, carbon nanotubes, metal oxide, or other conductive or semiconductive materials. In yet another embodiment, the conductors may include more than one or any combination of these conductive or semiconductive materials.

As conductors 402, 404 deform (e.g., stretch) and/or move relative to each other, strain-gauge controller 310 may measure the changing electrical characteristics of mesh 414. The electrical characteristics that change may include the resistance of conductor 402, 404 that is deformed or stretched, and/or the parasitic reactance and/or resistance between any two conductors 402, 404 as the distance between conductors 402, 404 changes. The measurement of the resistance and/or reactance in different locations of mesh 414 may indicate the strain applied to the different locations, and thus the deformation of color-filter glass 210, for example.

The number of locations that strain-gauge layer 209 may measure may be hundreds, thousand, tens of thousands, millions, tens of millions of locations, or more. The number of locations may depend on the number of horizontal conductors 402 and/or the number of vertical conductors 404. For example, the number of locations for measurement in mesh 414 as shown in FIG. 4 may be 36 (i.e., the product of the number of horizontal conductors 402 and the number vertical conductors 404).

Strain-gauge controller 310 may continuously or periodically measure the resistance and/or reactance at different locations of mesh 414. Strain measurements may be taken by strain-gauge layer 209 every second or fraction of a second (every nanosecond, microsecond, picosecond, etc., or every 0.1, 0.01, 0.001, 0.0001, 0.00001, 0.000001 seconds). In one embodiment, these measurements may be received by strain-gauge controller 310, processed by processor 510, and recorded in memory 520 in display device 100. Because strain-gauge layer 209 may include analog circuits to measure strain, mesh 414 may output continuous, analog signals that are sampled and quantized by strain-gauge controller 310. This configuration may allow for sampling to be performed at the clock rate of processor 510, for example.

Figure 5:
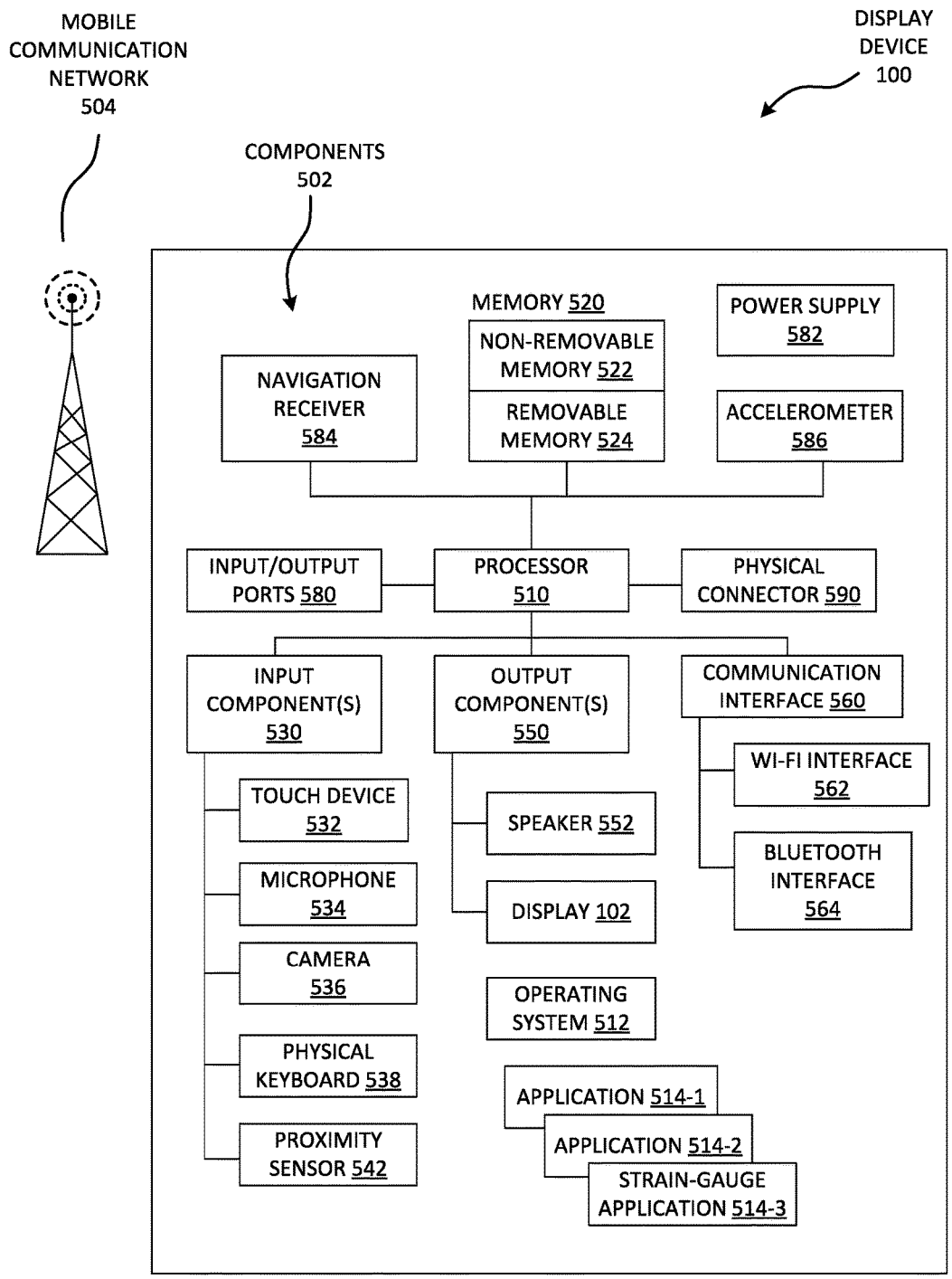
FIG. 5 is a block diagram of exemplary components in one embodiment of a display device.

As noted above, display device 100 may include more components than shown in FIGS. 2A through 2D. FIG. 5 is a block diagram illustrating additional components 502 of display device 100. As illustrated, display device 100 may include a controller or processor 510, an operating system (OS) 512, one or more application programs 514, a memory 520, input components 530, output components 550, a wireless communication interface 560, input/output ports 580, a power supply 582, an accelerometer 586, and/or a physical connector 590.

Processor 510 may include one or more microprocessors, ASICs, signal processors, or other control and processing logic circuitry. Processor 510 may perform tasks such as signal coding, data processing, input/output processing, power control, etc.

OS 512 may control the allocation and usage of the components in and provide support for one or more application programs 514. OS 512 may include MICROSOFT® WINDOWS®, ANDROID, LINUX, APPLE IOS, APPLE OS X, and/or UNIX, for example.

In one embodiment, applications 514 can include strain-gauge application 514-3. Strain-gauge application 514-3 can send instructions to strain-gauge controller 310 and receive information from strain-gauge controller 310, such as strain measurements. Strain-gauge application 514-3 can store these measurements in memory 520 of display device 100. Strain-gauge application 514-3 may be stored in memory 520 executed by processor 510. Strain-gauge application 514-3 can implement all or portions of a process, such as the process described below with respect to FIG. 8. In some embodiments, OS 512 can implement some or all of strain-gauge application 514-3

In one embodiment, processor 510, memory 520 (storing strain-gauge application 514-3), and strain-gauge layer 209 (e.g., integrated into display 102) are all in the same display device (e.g., all in the same housing, such as housing 110 or integrated chassis 205). This embodiment is in contrast to an embodiment in which strain gauges (which are attached to strain-gauge layer 209) include wires leading from the display device being tested for storing strain measurements off of display device 100.

Application programs 514 can also include mobile computing applications (e.g., image-capture applications, email applications, calendars, contact managers, web browsers, messaging applications), or any other computing application.

Memory 520 may include non-removable memory 522 and/or removable memory 524. Memory 520 may include random-access memory (RAM), read-only memory (ROM), flash memory, a hard disk, or other memory storage devices. Memory 520 (e.g., removable memory 522) can include flash memory or a Subscriber Identity Module (SIM) card, as used in a global system for mobile communications (GSM) network, or other memory storage technologies.

Memory 520 may be used for storing data and/or code for running OS 512 and application programs 514. Example data can include web pages, text, images, sound files, video data, or other data sets to be sent to and/or received from one or more network servers or other devices via one or more wired or wireless networks. Memory 520 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Input components 530 may include a touch device 532 (e.g., touch panel 202), a microphone 534, a camera 536, physical keyboard 538, and/or proximity sensor 542. Output components 550 may include a speaker 552 and/or display 102. Some components can serve more than one input/output function. For example, touch device 532 and display 102 can be combined into a single input/output device.

Communication interface 560 may include a wireless interface (e.g., a wireless modem), such as a Wi-Fi interface 562 and/or a Bluetooth interface 564. Communication interface 560 may be coupled to an antenna (not shown) and may support two-way communication between the processor 510 and external devices. Communication interface 560 can include a cellular modem for communicating with the mobile communication network 504 and/or other radio-based interfaces (e.g., Bluetooth or Wi-Fi). The communication interface 560 may be configured for communication with one or more cellular networks, such as a GSM network for data and voice communication within a single cellular network, between cellular networks, or between the mobile device and a public switched telephone network (PSTN). Communication interface 560 may include a wired interface, such as a physical Ethernet port.

Device 100 can further include an input/output port(s) 580, a power supply 582, a satellite navigation system receiver 584, such as a Global Positioning System (GPS) receiver, an accelerometer 586, a gyroscope (not shown), and/or a physical connector 590, which can be a USB port, an IEEE 1394 (FireWire) port, etc. Components 502 described here are not required or all-inclusive, as components can be removed and other components included. For example, components 502 may include a physical keyboard (not shown).

Any component 502 in device 100 can communicate with any other component 502, although not all connections between components 502 are shown. Device 100 can be any of a variety of computing devices (e.g., cell or mobile phone, smartphone, handheld computer, etc.) and can allow wireless two-way communication with wired or wireless communication networks, such as mobile communication network 504.

Figure 6:
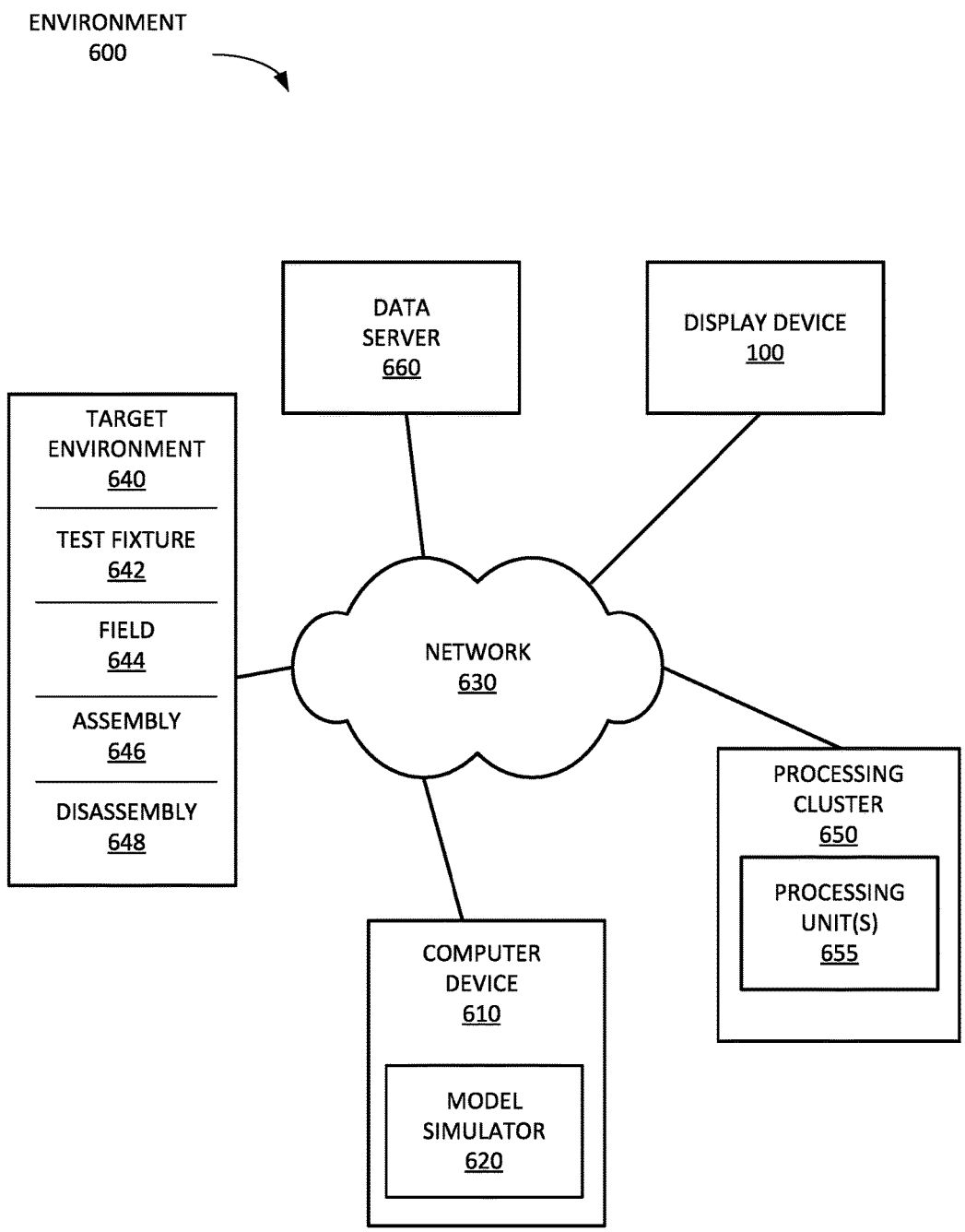
FIG. 6 is a block diagram of an exemplary environment for implementing embodiments described herein.

FIG. 6 is a block diagram of an exemplary environment 600 for implementing methods and systems described herein. As shown in FIG. 6, environment 600 may include a computer device 610, a network 630, target environment 640, display device 100, a processing cluster 650, and a data server 660.

Network 630 may enable any device in environment 600 to communicate with any other device in environment 600. Network 630 may include one or more wired and/or wireless networks. For example, network 630 may include a cellular or mobile network, the Public Land Mobile Network (PLMN), a long-term evolution (LTE) network, a code-division multiple-access (CDMA) network, a GSM network, a general packet radio services (GPRS) network, a Wi-Fi network, and/or an Ethernet network. Network 630 may include a local area network (LAN), a wide area network (WAN), a metropolitan area network (MAN), an ad hoc network, an intranet, the Internet, a fiber optic-based network, and/or a satellite network. Network 630 may include any combination of these networks.

Computer device 610 may include one or more computer modules, such as a personal computer, a workstation, a server device, a blade server, a mainframe, a laptop, a tablet computer, or another type of computation or communication device. Computer device 610 may include a model simulator 620.

Model simulator 620 may include a software tool that enables creation, modification, design, and/or simulation of models representing dynamic systems. A dynamic system is a system in which a response at any given time may be a function of its input stimuli, its current state, and/or a current time. The model may represent dimensions and physical connections (e.g., to specify rigid mechanical connections, voids with volume flow, etc.) operating in accordance with the laws of physics (e.g., "physics-based rules"). A model of a dynamic system may include, for example, a model of display 100, a model of a hard surface, and a model of forces (e.g., gravity) being exerted on display 100 and/or the hard surface.

The simulation or execution of a model of a dynamic system may include elemental dynamic systems (e.g., finite element analysis or FEA), such as a differential equation system (e.g., to specify continuous-time behavior), a difference equation system (e.g., to specify discrete-time behavior), an algebraic equation system (e.g., to specify constraints), etc. Attributes of the model may include sample times for executing the model elements. A simulation of a model of a dynamic physical system may include a continuous sample time such as a continuous-time integration function that may integrate an input value as time of execution progresses. During execution of the model, the continuous-time behavior may be approximated by a numerical integration scheme that is part of a numerical solver. The numerical solver may take discrete steps to advance the execution time, and these discrete steps may be constant or fixed or variable during an execution.

Model simulator 620 may perform FEA for solving strain and force calculations on a model of display device 100 (e.g., on color-filter glass 210) under different conditions, such as being dropped from a distance and a model of display device 100 (and components) experiencing a force at a particular location with a particular magnitude and direction.

Model simulator 620 may be implemented using MATRIXx from National Instruments; MATLAB by The MathWorks, Inc.; Mathematica from Wolfram Research, Inc.; Mathcad from Mathsoft Engineering & Education Inc.; Maple from Maplesoft; Extend from Imagine That Inc.; or Modelica or Dymola from Dassault Systemes, etc.

Processing cluster 650 includes processing resources that model simulator 620 may use to model a dynamic system including display device 100. Processing cluster 650 may include one or more processing unit(s) 655. Processing unit 655 may perform parallel processing (e.g., finite element analysis) of a model of display device 100 in a dynamic system. Model simulator 620 may send an operation to processing cluster 650 to perform, and processing cluster 650 can divide the operation into tasks and distribute the tasks among processing units 655. Processing cluster 650 receives results of the tasks from processing units 655, generates a result of the operation, and sends the result of the operation to model simulator 620.

In one implementation, a processing unit 655 may include a graphic processing unit (GPU). A GPU may include one or more devices that include specialized circuits for performing operations relating to performing a large number of operations in parallel. Processing unit 655 may correspond to a single core of a multi-core processor. Processing unit 655 may include a computer device that is part of a cluster of computer devices, e.g., computing devices operating as part of a computing cloud.

Data server 660 may include a computing device that manages and/or stores programs and data associated with collecting and analyzing strain-gauge data. Data server 660 may include one or more programs, such as a web server (e.g., Apache, or MICROSOFT INTERNET INFORMATION SERVICES® or IIS®), a database (e.g., MySQL, or MICROSOFT ACCESS®), or other applications.

Data server 660 includes one or more computing devices having memory to store data from display devices 100, such as measurements from strain-gauge layer 209 of each device 100. In one embodiment, the user of device 100 must take an affirmative action before data is collected from device 100 and stored in data server 660. Once the user has taken an affirmative action to store data in data server 660, the user can take an affirmative action to prevent any further collection of data. In addition, the user of any device 100 may take an affirmative action to delete any previous user data stored to data server 660.

Target environment 640 includes the environment in which display device 100 will operate. For example, target environment 640 may include "the field" 644, such as the home of a consumer using display device 100. Target environment 640 may include test fixture 642 where engineers test display device 100 by dropping display device 100 from a height onto a hard surface. Target environment 640 could include the manufacturing floor during assembly 646 or disassembly 648 of display device 100. Model simulator 620 models display device 100 in these dynamic system environments.

Figure 7A:
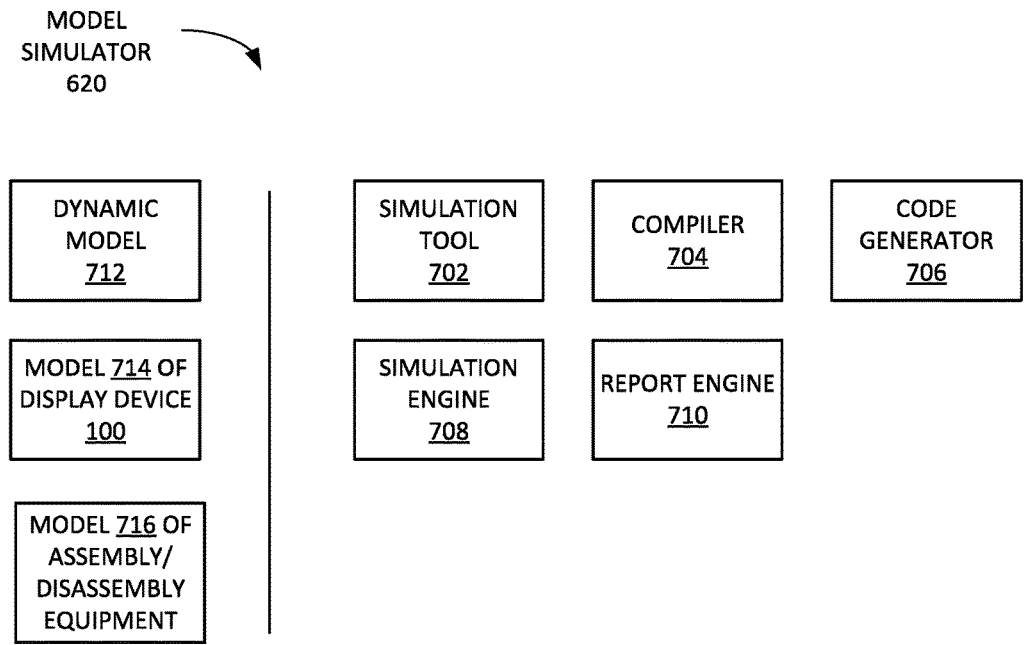
FIG. 7A is a block diagram illustrating exemplary components of a model simulation system.

As discussed above, display device 100 may include a set of sensors and/or a set of controllers (e.g., strain-gauge layer 209). Model simulator 620 may receive data (e.g., strain measurements) from display device 100 (e.g., through network 630). Model simulator 620 may then use the received data (e.g., the received strain limits) as input of parameters to a model of a dynamic system and/or display device 100. As shown in FIG. 7A, model simulator 620 includes a dynamic model 712 and a model 714 of display device 100. Model simulator 620 may also include a simulation tool 702, a compiler 704, a code generator 706, a simulation engine 708, and a report engine 710.

Dynamic model 712 may include a model of display device 100 in a dynamic system, such as: display device 100 being dropped in a gravitational field onto a hard surface; display device 100 being assembled during manufacturing; and/or display device 100 being disassembled for recycling or refurbishment.

Model 714 of display device 100 may include models of components of display device 100 and/or display 102 (and the interconnections between components), such as models of integrative chassis 205, housing 110, protective layer 106, touch panel 202, clear adhesive 206, polarizer 208, color-filter glass 210, liquid crystals 212, TFT glass 214, polarizer 216, light guide 218, reflector 226, etc. Model 714 of display device 100 associates strain measurements that correspond to failures of display 102, for example. Model 716 of assembly or disassembly equipment may include models of components of the equipment that assembles display device 100 and/or disassembles display device 100.

Simulation tool 702 may include an application for building a model, such as dynamic model 712 and/or a model 714 of display device 100. The designer of display device 100 can use simulation tool 702 to build a model having executable semantics, such as a dynamic system model. The designer may use simulation tool 702 to create, display, modify, diagnose, annotate, delete, print, etc., model entities and/or connections. Simulation tool 702 may provide a user with an editor or graphical user interface for constructing or interacting with models.

Compiler 704 may compile a model, such as dynamic system model, into an executable format. Code generator 706 may generate code from a compiled model produced by compiler 704. The generated code may be executed on computer device 610 to produce a modeling result. Simulation engine 708 may perform operations for executing a model to simulate a system.

Report engine 710 may produce a report based on information in model simulator 620. For example, report engine 710 may produce a report indicating whether a display device 100 satisfies design specifications (e.g., whether glass has broken or not). Embodiments of report engine 710 can produce reports in an electronic format for display on output device 780, for example.

Although FIGS. 6 and 7A show exemplary components of environment 600 and model simulator 620, in other implementations, environment 600 and/or model simulator 620 may include fewer components, different components, differently arranged components, and/or additional components than those depicted in FIG. 6. Additionally, one or more components of environment 600 and/or model simulator 620 may perform one or more tasks described as being performed by one or more other components of environment 600 and/or model simulator 620.

Figure 7B:
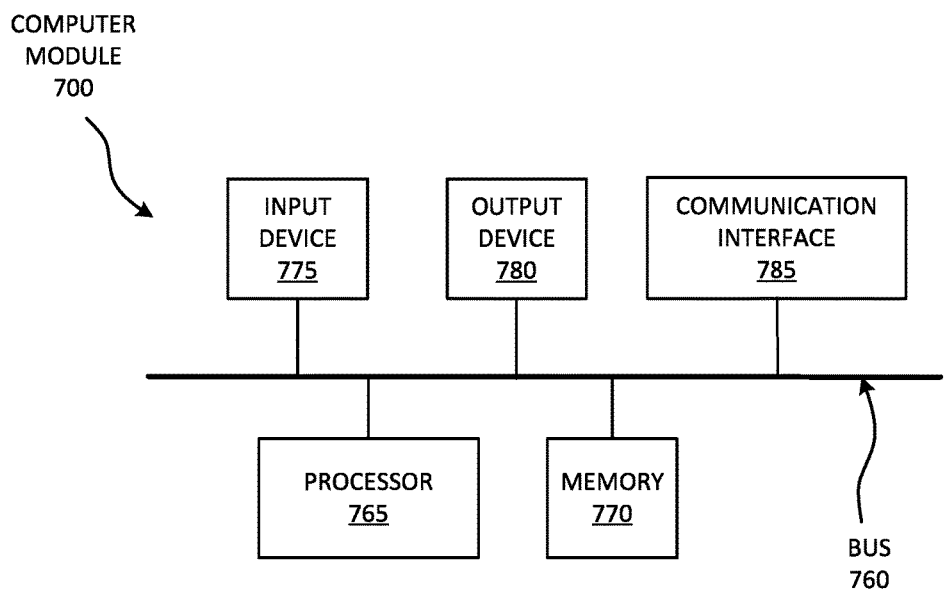
FIG. 7B is a block diagram illustrating exemplary components of a computer module according to one embodiment.

Devices in environment 600 may each include one or more computing modules. FIG. 7B is a block diagram illustrating exemplary components of an exemplary computer module 700 according to one embodiment. As shown in FIG. 7B, computer device 700 may include a bus 760, a processor 765, a memory 770, an input device 775, an output device 780, and a communication interface 785.

Bus 760 enables communication among the components of computer module 700. Processor 765 may include one or more single-core and/or or multi-core processors, microprocessors, and/or processing logic (e.g., application specific integrated circuits (ASICs), field programmable gate arrays (FPGAs), ARM processors, etc.) that interpret and execute instructions.

Memory 770 may include a RAM device or another type of dynamic storage device that may store information and instructions for execution by processor 265. Memory 770 may include a ROM device or another type of static storage device that may store static information and instructions for use by processor 765. Memory 770 may include a magnetic and/or optical recording memory device, and/or a removable form of memory, such as a flash memory stick. Memory 770 is a computer-readable medium, such as a non-transitory memory device.

Input device 775 enables an operator to input information into computer module 700. Input device 775 may include a keypad, a keyboard, a button, or an input jack for an input device such as a keypad or a keyboard, a camera, etc. Output device 780 outputs information to the operator. Output device 780 may include display 102, a light, a speaker, etc.

Display 102 may include a cathode ray tube (CRT), plasma display device, light emitting diode (LED) display device, liquid crystal display (LCD) device, etc. Display 102 may be configured to receive user inputs (e.g., via a touch panel 202).

Communication interface 785 may include a transmitter and/or a receiver (e.g., a transceiver) that enables computer module 700 to communicate with other devices. Communication interface 785 may include a network interface card, and/or a wireless interface card, for example.

Software instructions may be read into memory 770 from another computer-readable medium, or from another device via communication interface 785. The software instructions contained in memory 770 may cause processor 765 to perform processes that is described later. Alternatively, hardwired circuitry may be used in place of or in combination with software instructions to implement processes described herein. Thus, implementations described herein are not limited to any specific combination of hardware circuitry and software.

Computer module 700, employed in computing device 610, may perform operations relating to simulating a model of strain and force experienced by a model dynamic system including a model of display device 100 (e.g., including a model of a chassis and/or glass). Computer module 700 may perform these operations in response to processor 765 executing software instructions stored in a computer-readable medium, such as memory 770.

Although FIG. 7B shows exemplary components of computer module 700, in other implementations, computer module 700 may include fewer components, different components, additional components, or differently arranged components than depicted in FIG. 7B.

Figure 8:
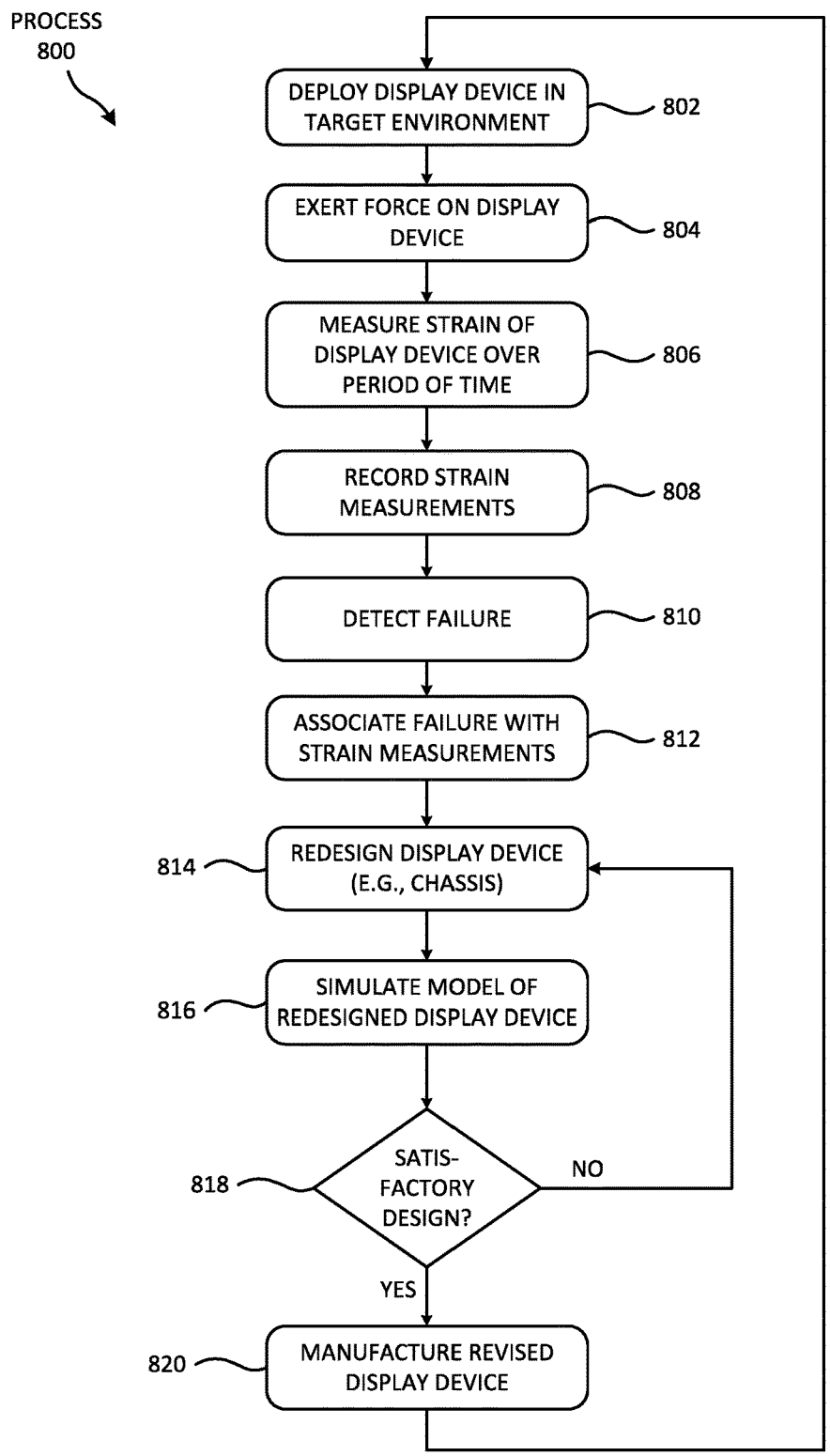
FIG. 8 is a flowchart of a process for measuring strain limits of a display device in one embodiment.

FIG. 8 is a flowchart of a process 800 for measuring strain limits of a display device. Process 800 may be performed by the devices in environment 600, such as display device 100 running OS 512 and/or application 514-3, and by computer device 610 and model simulator 620. Process 800 is described below with three examples of target environment 640. The first example includes dropping and breaking display 102 of display device 100 while placed in test fixture 642. The second example includes distorting the color rendered by display 102 while placed in test fixture 642. The third example includes display device being deployed in the field 644 (e.g., with an end user). The fourth example includes display device 100 being assembled and disassembled in assembly target environment 648 and disassembly target environment 648.

Process 800 may begin by placing a display device 100 (e.g., a test or first device) in the target environment (block 802). In the following first example, display device 100 is placed in a test fixture 642 of target environment 640. Device 100 includes one or more chassis to hold display 102. For example, integrative chassis 205, housing 110, display chassis 262A, and/or system chassis 264A hold display 102. A force is exerted on display device 100 and/or the components of display device 100 (block 804). In the current example, test fixture 642 may exert force on display device 100 for the purpose of testing the strength of display device 100 and/or display 102. In one case, test fixture drops display device 100 by 1, 2, 3, 4, 5, or more feet onto a hard surface. As another example, test fixture 642 has a frame in which display device 100 is mounted and test fixture 642 twists or bends display device 100.

Process 800 continues by measuring strain on display 102 of display device 100 over a period of time (e.g., a test or first period) (block 806) (such as a period of time in which a failure occurs). In one embodiment, the strain measurements are taken by integrated strain-gauge layer 209 in or on display 102 (e.g., on color-filter glass 210). Strain-gauge application 514-3 (or OS 512) may instruct strain-gauge controller 310 to measure strain from strain-gauge layer 209. The measurements may be from many different locations of strain gauge layer 209 (e.g., many different locations on the surface of color-filter glass 210). Because strain gauge layer 209 is on the surface of color-filter layer 210, the strain measurements may indicate the degree of deformation of or strain on color-filter glass 210. Since color-filter glass 210, however, is tightly assembled in display 102 with other components, the strain measurements are also indicative of the force on or the deformation of the other components of display 102, such as protective layer 106, touch panel 202, polarizer 208, liquid crystals 212, TFT glass 214, polarizer 216, light guide 218, and/or reflector 226. Strain may be measured during the test period, such as during a fall from a height until after impact on a hard surface.

As noted above, strain measurements may be taken by strain-gauge layer 209 every second or fraction of a second and at hundreds, thousands, millions, or tens of millions of locations.

The strain measurements are recorded (block 808). In one configuration, strain-gauge application 514-3 stores the strain measurements in memory 520 of the device being tested (e.g., display device 100 itself). In another configuration, strain-gauge application 514-3 stores the measurements in data server 660. In one embodiment, strain measurements may be associated with the time at which the corresponding strain measurement was recorded.

In these examples, the user of device 100 must take an affirmative action before data is collected and stored in display device 100. Once the user has taken an affirmative action to collect and store this data in data display device 100, the user can also take an affirmative action to prevent any further collection of data. In addition, the user of display device 100 may take an affirmative action to delete any user data stored to display device 100.

Process 800 includes detecting a failure (block 810) of display 102 during the time period. In the current example, failure is broken glass in display 102 (or other catastrophic failure of display 102) when display device 100 lands on the hard surface after having been dropped from a height. Detecting a failure may include a visual inspection of display 102 to determine if it has been cracked or otherwise damaged. Detecting the failure may include detecting one or more broken protective layer 106, touch panel 202, clear adhesive 206, polarizer 208, color-filter glass 210, liquid crystals 212, TFT glass 214, polarizer 216, light guide 218, and/or reflector 226.

Process 800 includes associating the failure with the recorded display measurements (block 812). In the current example, not all the strain gauge measurements are necessarily associated with display 102 breaking. In this case, the maximum strain measurements may be assumed to be associated with display 102 breaking. In one implementation, application 514-3 also stores measurements from accelerometer 586. In this case, the strain measurements associated with a rapid deceleration or a rapid acceleration may be associated with the failure (e.g., the absolute magnitude of acceleration passing a threshold). The measurements associated with the failure may be referred to as "strain limits." These strain limits may form part of a model of display 102 used for simulation of a dynamic environment.

Given the information learned by recording the strain experienced by display device 100, the designer may redesign device 100 (block 814) to reduce the risk of failure. For example, the designer could change or revise the design of housing 110, system chassis 264, display chassis 262, integrative chassis 205, and/or other components of display device 100 to make these components more or less stiff, for example. Rather than manufacture the revised device and test the revised display device 100, the designer may simulate a model 714 of the redesigned display device 100. The model 714 of the redesigned display device may include a model of display 102, in which the strain limits may be associated with failure.

Thus, process 800 may continue by simulating dynamic model 712 including a model 714 of a redesigned device (e.g., a revised device or a second device) (block 816). The dynamic model 712 may include, for example, dropping display device 100 (having display 102) in a gravitational field whereby it lands on a hard surface. In one embodiment, simulation of the model 714 of the revised display device includes simulating the model 714 of the redesigned device 100 based on what was learned during the test in the target environment, e.g., the drop test and associated strain measurements associated with the failure (from block 812). That is, the model 714 of the redesigned display device 100 may include a model of display 102 that failed (e.g., the model of display 102 or a failure of the model of display 102 is informed by or associated with the strain measurements associated with failure). Model 714 of the redesigned device may include a model of any redesigned component of display device 100 (e.g., discussed above with respect to FIGS. 2A through 2D). The simulation may include modelling the dropping of the model of display device 100 from a distance (e.g., applying force on the model of display device 100) and determining if the model of display 102 fails. In one embodiment model simulator 620 simulates dynamic model 712 including model 714 of display device 100.

If the simulations are not successful (block 818: NO), then device 100 may be redesigned (block 814) and simulated again (block 816) until a redesign is successful (block 818: YES). A successful design may be a design of a chassis (e.g., integrative chassis 205) that result in a failure only 5% of the time when a force on display device reaches a certain maximum (e.g., reaches a threshold), for example. Because of the iterative process (blocks 814, 816, and 818), the design and redesign process may be accelerated (i.e., without having to manufacture every redesign of device 100). This iterative process may be made possible by a better informed simulation process, e.g., better informed by strain gauge measurements of strain-gauge layer 209 and strain-gauge controller 310.

Once a redesign is satisfactory (block 818: YES), then the redesigned (or second) display device 100 may be manufactured (block 820) and process 800 may begin again with the deployment of the redesigned display device 100 being deployed for another test or in the field (block 802). Thus, process 800 may continue in an iterative, rapid prototyping process. The redesigned chassis secures the redesigned second display device. Like the first display device, the redesigned, second display device includes a second integrated strain gauge layer in or on the second display for recording strain measurements at a plurality of locations on the display. The satisfactory redesign may become the final design, and therefore the second (or subsequent) manufacture (block 820) of display device 100 according to the satisfactory redesign may be the final product sold to consumers.

In one embodiment, simulating the model (block 816) of the redesigned (second) display device includes simulating deformation of the model of the display based on the identified one or more strain measurements.

This iterative process 800 may continue measuring the strain of the second display of the redesigned device over another period (e.g., second period) of time (block 806) and recording second strain measurements (block 808) while applying a force (block 804). Process 800 may detect a second failure of the second display during the second time period (block 810) and associate one or more of the second strain measurements with the second failure (block 812). Process 800 may simulate a model of yet another (e.g., a third) redesigned device that includes a model of the display (e.g., the display that has failed again) and a model of yet another redesigned chassis (e.g., a third chassis) different than the first chassis and second chassis (block 816) including simulating deformation of the model of the display based on the identified one or more strain measurements.

In the second example, the failure of display 102 is distorted or incorrect color rendering of display 102. Incorrect color rendering may include, for example, locations that should appear as red, blue, and/or green on display 102 that appear as white when on a black background. In this example, detecting failure (block 810) includes detecting poor or incorrect color rendering. If display 102 is deformed to an extent that liquid crystals 212 do not properly change the polarity of light passing through, the color of pixels on display 102 as perceived by the user may be incorrect. In this case, test fixture 642 may bend, warp, prod, or poke display 102 (block 804) to induce a failure in the color rendering of display 102. Display 102 may show a test image during the time period. Test fixture 642 may include a camera to capture an image of the test image on display 102 of the device under test. Process 800 may capture, with the camera, an image of the display during the time period and compare the captured image with the test image to determine the failure that includes distorted color rendering (block 810) If the color of the captured image is sufficiently different than the color of the ideal test image, test fixture 642 may indicate a failure and record the time associated with the failure (block 810). Because strain measurements may be associated with a corresponding time (block 808), the failure (e.g., poor color rendering) may be associated with the corresponding strain measurements (block 812).

As with the first example, display device 100 (e.g., chassis) may be redesigned (block 814) with the failure and measurements in mind. The redesigned model of the display device 100 may be simulated (block 816), redesigned again (block 818: NO; block 814) until a satisfactory design has been reached (block 818: YES).

In the third example, display device 100 is not deployed in test fixture 642 but instead is deployed in the field 644 (block 802). The field 644 may include test devices given to testers and/or developers or even products sold to consumers. During this type of testing, display device 100 experiences forces (block 804) through regular wear and tear. Regular wear and tear could include dropping display device 100 on the ground accidently, sitting on display device 100 accidently, throwing display device 100 to a friend, etc.

During this time, strain-gauge controller 310 and strain-gauge layer 209 may measure strain on display 102 and record the measurements in memory 520 of display device 100. Display device 100 may also record the time, date, location, and accelerometer measurements associated with time and/or the strain measurements.

In this example, if display device 100 measures (block 806) and records (block 808) a very high strain measurement that may be associated with a failure (block 810), then the strain measurement (and the other information) may be sent to data server 660. Alternatively, or in addition, if display device 100 measures and records very high deceleration or acceleration, then strain measurement, acceleration information, and/or other information may be sent to data server 660. In this case, strain measurements associated with a rapid deceleration or acceleration may be associated with the failure (e.g., the absolute magnitude of acceleration passing a threshold).

In this example, the user of device 100 must take an affirmative action before data is collected and stored in data server 660. Once the user has taken an affirmative action to collect and store this data in data server 660, the user can also take an affirmative action to prevent any further collection of data. In addition, the user of display device 100 may take an affirmative action to delete any user data stored to data server 660.

In one embodiment, the user of display device 100 may be prompted and asked if display 102 of her display device 100 has broken (block 810) (e.g., when strain measurements pass a threshold or deceleration passes a threshold). The user of display device 100 may input into display device 100 whether the display has broken or not. If the display has broken (block 810) or if there is no response to the question (block 810), then display device 100 may send the strain measurement data to data server 660. In another embodiment, the user of display device 102 may be asked (via speaker 552) whether display 102 has broken. The user may respond by voice via microphone 534 with "yes" or "no." In this case, display device 100 may go through redesign (block 814), simulation (block 816) as described above with the strain measurements returned from the field 644.

In the fourth example, once strain limits (block 808) are determined, the following dynamic model may be determined: dynamic assembly by assembly equipment, and dynamic disassembly by disassembly equipment. Assembly equipment and the assembly process may itself be a model that is simulated or executed by (block 816). Further, disassembly equipment and the disassembly process may also be a model that is simulated or executed by (block 816). Assembly equipment may be lightened and assembly may be accelerated (e.g., the motion of robotic equipment) based on strain measurements (block 812) determined during testing and based on models 714 of chassis. Disassembly equipment may be lightened and disassembly may be accelerated (e.g., the motion of robotic equipment) based on strain measurements (block 812) determined during testing and based on models 714 of chassis. In one embodiment, the assembly or disassembly equipment may be programmed to move faster or slower, or apply more or less forced based on strain measurements (block 812) determined during testing and based on models 714 of chassis.

In one embodiment, assembly and disassembly may occur when the display device 100 is turned on (e.g., OS 512 and/or strain-gauge application 514-3 is running). In other words, display device 100 may be deployed (block 802) in the assembly target environment 646 and the disassembly target environment 648. In this example, when assembly or disassembly exerts force on display device 100 (block 804), the strain may be measured over time (block 806) and recorded (block 808). Failure can be detected (block 810) and associated with the appropriate strain measurements (block 812). The strain measurements may be used to further redesign and simulate new display devices 100.

In an alternative method, the strain measured by strain-gauge controller 310 may be reported to OS 512.

No element, act, or instruction used in the description of the present application should be construed as critical or essential to the invention unless explicitly described as such. As used herein, the articles "a" and "the" and the term "one of" are intended to include one or more items. Further, the phrase "based on" means "based, at least in part, on" unless explicitly stated otherwise.

In the preceding specification, various preferred embodiments are described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A system comprising:
 a first device including:
  a display that is deformable,
  a first chassis for securing the display in the first device,
  an integrated strain-gauge layer in or on the display for measuring strain at a plurality of locations on the display,
  a memory to store the strain measurements of the display at the plurality of locations, and
  a processor configured to instruct the integrated strain-gauge layer to measure the strain and to instruct the memory to store the strain measurements; and
 wherein the memory is configured to store:
  a model of a second device, wherein the model of the second device includes a model of the display and a model of a second chassis different than the first chassis, wherein the model of the display associates one or more of the strain measurements with a failure of the model of the display, wherein the model of the second chassis secures the model of the display, and
  a dynamic model of an application of force on the model of the second device; and
 wherein the processor is configured to simulate the dynamic model of the application of force on the model of the display to determine if a failure occurs under the force of the model of the display secured by the model of the second chassis.

2. The system of claim 1, wherein the integrated strain-gauge layer is attached to a surface of a color-filter glass in a liquid crystal display assembly or a thin-film transistor (TFT) glass in a liquid crystal display.

3. The system of claim 1, wherein the failure includes broken glass in the display.

4. The system of claim 3, further comprising:
 an input device to receive an input from a user indicating that the glass in the display has broken.

5. The system of claim 4, further comprising an output device to prompt the user to input an indication of whether the glass in the display has broken when strain measurements pass a first threshold.

6. The system of claim 4, further comprising:
 an accelerometer to measure acceleration of the first device; and
 an output device to prompt the user to input an indication of whether the glass in the display has broken when an absolute magnitude of the acceleration of the first device passes a second threshold.

7. The system of claim 1, wherein the failure includes incorrect rendering of color by the display.

8. The system of claim 7, wherein the display is configured to display a test image on the display of the first device during a period of time, the system further comprising:
 a camera to capture an image of the display during the period of time, wherein the failure is indicated by a difference between the captured image and the test image.

9. The system of claim 1 further comprising:
the second device, having the second chassis and a second display, manufactured according to the model of the second device including the model of the second chassis and the model of the display.

10. The system of claim 1, further comprising:
wherein the processor is configured to simulate a dynamic system including a model of assembly or disassembly equipment and a model of the second device, including simulating deformation of the model of the display based on the strain measurements.

11. A method comprising:
measuring, over a period of time, strain of a display of a first device at a plurality of locations on the display, wherein the display is deformable and secured to the first device by a first chassis, wherein the display includes an integrated strain-gauge layer in or on the display for measuring the strain at the plurality of locations on the display;
recording the strain measurements in a memory of the first device;
associating one or more of the strain measurements with a failure of the display;
simulating a dynamic model including a model of a second device,
  wherein the model of the second device includes a model of a second chassis different than the first chassis and a model of the display associated with the failure, wherein the model of the second chassis secures the model of the display and
  wherein the dynamic model includes application of a force on the model of the second device, and
  wherein simulating the dynamic model includes simulating deformation of the model of the display based on the one or more strain measurements associated with the failure of the display to determine a failure of the model of the display.

12. The method of claim 11, wherein the integrated strain-gauge layer is attached to a surface of a color-filter glass in a liquid crystal display assembly or a thin-film transistor (TFT) glass in a liquid crystal display.

13. The method of claim 11, wherein the failure of the display includes broken glass in the display.

14. The method of claim 13, further comprising:
detecting the failure of the display, wherein detecting the failure includes receiving an input from a user indicating that the glass in the display is broken.

15. The method of claim 14, further comprising prompting the user to input an indication of whether the glass in the display has broken when the strain measurements pass a first threshold.

16. The method of claim 14, further comprising:
measuring acceleration of the first device; and
prompting the user to input an indication of whether the glass in the display has broken when an absolute magnitude of the acceleration of the first device passes a second threshold.

17. The method of claim 11, wherein the failure of the display includes incorrect rendering of color by the display.

18. The method of claim 17, wherein detecting the failure includes:
displaying a test image on the display of the first device during the period of time;
capturing, with a camera, an image of the display during the period of time; and
detecting the failure of the first device by comparing the captured image with the test image.

19. The method of claim 11, further comprising:
simulating a dynamic model including a model of assembly or disassembly equipment and a model of the second device, wherein simulating the dynamic model of assembly or disassembly equipment includes simulating deformation of the model of the display during assembly or disassembly based on the one or more strain measurements; and
wherein the assembly or disassembly equipment is configured to assemble or disassemble based on the simulating the dynamic model including the model of assembly or disassembly equipment.

20. A system comprising:
a first display device including:
  a display that is deformable,
  a first chassis for securing the display in the first display device,
  an integrated strain-gauge layer in or on the display for measuring strain at a plurality of locations on the display,
  a memory to store the strain measurements of the display at the plurality of locations, and
  a processor configured to instruct the integrated strain-gauge layer to measure the strain and to instruct the memory to store the strain measurements during a period of time in which the display experiences a failure; and
a computing device comprising:
  a memory to store:
    a model of a second device, wherein the model of the second device includes a model of the display that experienced the failure and a model of a second chassis different than the first chassis, wherein the model of the display associates the strain measurements with the failure of the display, wherein the model of the second chassis secures the model of the display, and
    a dynamic model of an application of force on the model of the second device; and
  a processor configured to simulate the dynamic model of the application of force on the model of the display to determine if a failure occurs under the force of the model of the display secured by the model of the second chassis.

* * * * *